United States Patent [19]
Dentai et al.

[11] Patent Number: 5,434,943
[45] Date of Patent: Jul. 18, 1995

[54] NANOSECOND FAST ELECTRICALLY TUNABLE FABRY-PEROT FILTER

[75] Inventors: Andrew G. Dentai, Atlantic Highlands; Julian Stone, Rumson, both of N.J.

[73] Assignee: AT&T Corp., Murray Hill, N.J.

[21] Appl. No.: 146,849

[22] Filed: Nov. 3, 1993

[51] Int. Cl.$^6$ .............................................. G02B 6/44
[52] U.S. Cl. ...................................... 385/129; 257/80
[58] Field of Search .................. 385/1, 2, 4, 8, 129, 385/130, 131, 132, 14, 50, 49, 12, 16; 272/10, 26, 29, 45, 46, 50, 38, 96, 97, 108; 437/22, 129, 148, DIG. 148, 130, 133, 958, 981; 156/647, 649, 655; 257/14, 15, 80, 191, 212; 359/321, 245

[56] References Cited
U.S. PATENT DOCUMENTS

| | | | |
|---|---|---|---|
| 4,777,148 | 10/1988 | Liau et al. | 437/129 X |
| 4,805,184 | 2/1989 | Fiddyment et al. | 385/130 X |
| 5,048,038 | 9/1991 | Brennan et al. | 372/46 |
| 5,102,825 | 4/1992 | Brennan et al. | 437/129 |
| 5,268,328 | 12/1993 | Mori et al. | 372/45 X |

OTHER PUBLICATIONS

J. Stone and L. W. Stulz, "Pigtailed High-Finesse Tunable Fibre Fabry-Perot Interferometers With Large, Medium and Small Free Spectral Ranges," *Elect. Lett.*, vol. 23, pp. 781-783 (1987).
T. Numai et al., "1.5 μm Tunable Wavelength Filter with Wide Tuning Range and High Constant Gain Using a Phase-controlled Distributed Feedback Laser Diode," *Appl. Phys. Lett.*, vol. 53, No. 13 (Sep. 25, 1988).
Katsuaki Margari, "Optical Signal Selection with a Constant Gain and a Gain Bandwidth by a Multielectrode Distributed Feedback Laser Amplifier" *Appl. Phys. Lett.*, vol. 51, No. 24 (Dec. 14, 1987).
Applied Physics Letters, vol. 53, No. 13, Sep. 1988, New York US, pp. 1168-1169, T. Numai et al. "1.5 μm Tunable Wavelength Filter with Wide Tuning Range and High Constant Gain using a Phase-Controlled Distributed Feedback Laser Diode".
Electronics Letters, vol. 23, No. 15, Jul. 1987, Stavenage GB, pp. 781-783, J. Stone et al., "Pigtailed High--Finesse Tunable Fibre Fabry-Perot Interferometers with Large, Medium and Small Free Spectral Ranges".
Journal of Lightwave Technology, vol. 6, No. 5, May 1994, New York US, pp. 629-631, A. Dentai et al. "Electrically Tunable Semiconductor Fabry-Perot Filter".
Applied Physics Letters, vol. 51, No. 24, 14 Dec. 1987, New York US, pp. 1974-1976, K. Magari et al., "Optical Signal Selection with a Constant Gain and a Gain Bandwidth by a Multielectrode Distributed Feedback Laser Amplifier".
Applied Physics Letters, vol. 59, No. 20, 11 Nov. 1991, New York US, pp. 2573-2575, R. C. Alferness et al., "Vertically Coupled InGaAsP/Inp Buried Rib Waveguide Filter".

*Primary Examiner*—Akm E. Ullah

[57] ABSTRACT

The present invention is directed at an electrically tunable filter for wavelength filtering of light. The filter comprises a substrate region, a waveguide region over the substrate, an upper region over the waveguide region, and current blocking regions adjacent to the waveguide region. The waveguide region comprises a semiconductor having a bandgap wavelength sufficiently different from the light for high peak transmission of the light. A waveguide rib layer may also be included in the waveguide region to channel the light through the filter. The current blocking regions narrow the waveguide region to increase the current density. The present invention is also directed at a method of manufacturing the filter described above.

21 Claims, 3 Drawing Sheets

NANOSECOND FAST ELECTRICALLY TUNABLE FABRY-PEROT FILTER

BACKGROUND OF THE INVENTION

1. Field of the Invention

The present invention is directed generally at filtering wavelengths, and more specifically at filtering multiplexed wavelengths using an electrically tunable Fabry-Perot filter.

2. Information Disclosure Statement

A key component of Wavelength Division Multiplexed (WDM) networks is a tunable broadband wavelength demultiplexer. The ideal wavelength filter would be widely tunable with constant transmittance over the entire free spectral range, would be quickly tunable with narrow channel spectrum selectivity (high finesse), and would be integrable with other lightwave components such as amplifiers or detectors. To that end, many different devices have been developed as demultiplexers, such as a piezoelectrically tunable fiber Fabry-Perot filter and a laser diode operated below threshold.

A piezoelectrically tunable Fabry-Perot fiber is described in J. Stone and L. W. Stulz, "Pigtailed High-Finesse Tunable Fibre Fabry-Perot Interferometers With Large, Medium and Small Free Spectral Ranges," Elect. Lett., Vol. 23, pp. 781-783 (1987). This article describes three Fabry-Perot filter prototypes and their test results. All three designs used standard PZT piezoelectric components for tuning. These filters yielded finesse values up to 200. Furthermore, an insertion loss as low as 1.5 dB was observed for lower finesse values. Thus, mechanically adjusted filters have excellent wavelength selectivity and low insertion loss. Since they are mechanically tuned, however, they can only attain tuning speeds in the order of milliseconds. Therefore, a need exists for faster tuning filters.

Semiconductor devices with inherently faster tuning speed have been reported by a number of groups For example, T. Numai et al., "1.5 $\mu$m Tunable Wavelength Filter with Wide Tuning Range and High Constant Gain Using a Phase-controlled Distributed Feedback Laser Diode," Appl. Phys. Lett., Vol. 53, No. 13 (Sep. 26, 1988), and Katsuaki Magari, "Optical Signal Selection with a Constant Gain and a Gain Bandwidth by a Multielectrode Distributed Feedback Laser Amplifier" Appl. Phys., Lett., Vol. 51, No. 24 (Dec. 14, 1987) describe laser diodes with wide tuning ranges and high tuning speed. However, laser filters suffer from gain instability. Gain instability arises in laser diodes because they absorb light at the wavelengths typically used in multiplexing, e.g., 1.55 $\mu$m.

To overcome this problem and achieve a "transparent" condition, current is applied across the laser diode. This excites the electrons so that they cannot absorb the light energy. Although this creates a transparent condition, the diode becomes highly excited. In fact, the diode is biased just below the threshold current of the laser.

Because the bias hovers just below the threshold current, a slight energy change may cause the diode to cross the threshold and become a laser emitter. The transmission of light, for example, may provide the requisite energy for the diode to cross the laser threshold. Additionally, because tuning requires current injection, the tuning process may push the diode over the laser threshold. If the diode crosses the threshold and becomes an emitter, significant damage may result.

In addition to instability, a laser diode suffers from tuning shortcomings. For example, the shape of the transmission spectrum varies as the current varies. Furthermore, current variations produce non-linear shifts in the transmission light wavelengths. Both of these shortcomings hinder the tunability of a laser diode filter.

Thus, the need remains for a wavelength filter with not only quick tunability, but also gain stability, constant filter shape, and linear tuning. The present invention fulfills this need.

SUMMARY OF THE INVENTION

The present invention is directed at filtering light of multiple wavelengths. An object of the invention is to provide a filter which remains transparent at zero current bias and at all tuning currents for a particular transmission wavelength. This allows the filter to avoid the instability problems inherent with laser diodes.

Another object of the invention is to provide a filter with quick tunability. Because the present invention is electrically controlled, it can be tuned in nanoseconds. This presents a marked improvement over piezoelectrically tunable Fabry-Perot filters which tune in the order of milliseconds.

Still another object of the invention is to provide a filter with high tunability. This entails a filter with a wide spectral range, a low insertion loss, and a high finesse. The configuration and composition of the present invention achieves these objectives as well.

BRIEF DESCRIPTION OF THE DRAWINGS

For a fuller understanding of the nature and object of the invention, the reader should take note of the detailed description taken in connection with the accompanying drawings in which.

DETAILED DESCRIPTION OF THE PRESENT INVENTION

Figure 1:
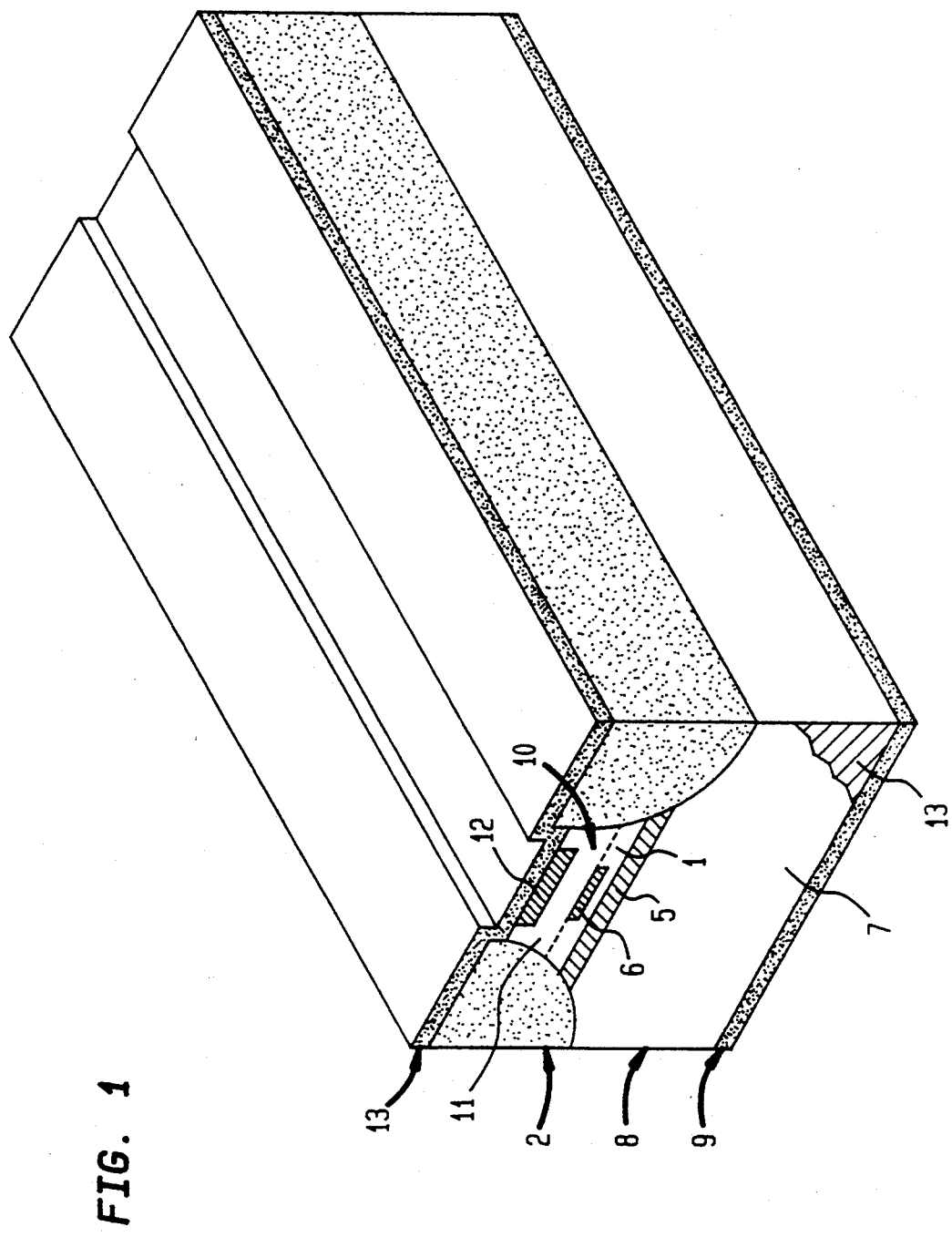
FIG. 1 shows the structure of a preferred embodiment.
Figure 2A:
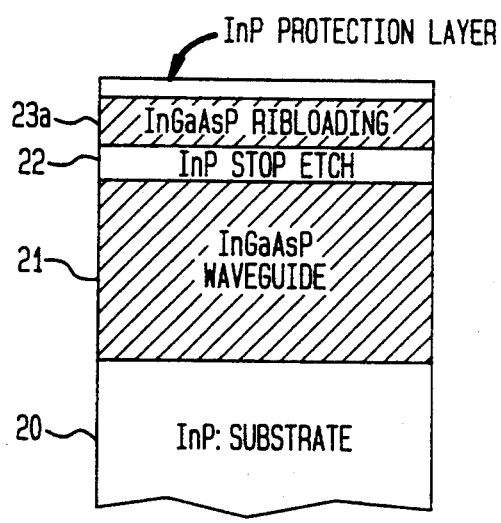
FIG. 2 shows four stages of making the filter using one preferred method of forming the current blocking regions.
Figure 2B:
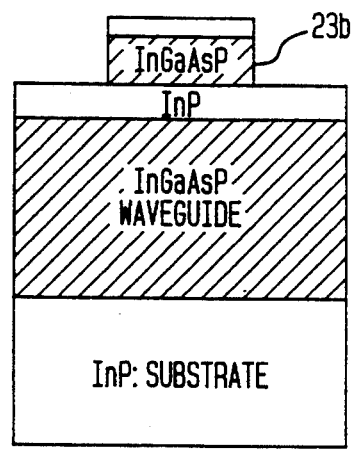
Figure 2C:
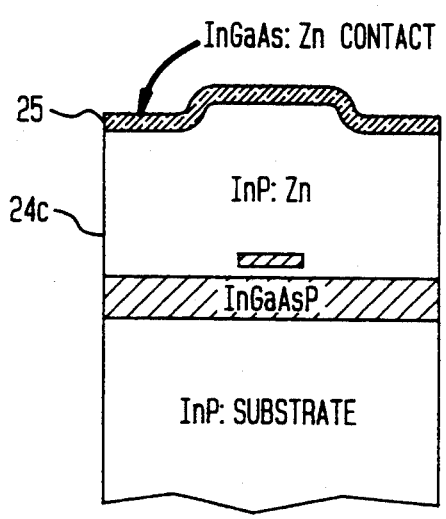
Figure 2D:
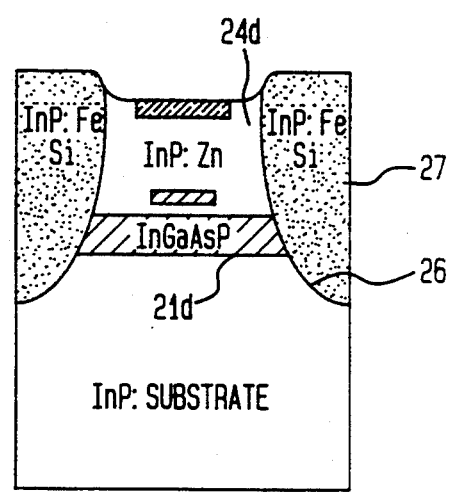
Figure 3A:
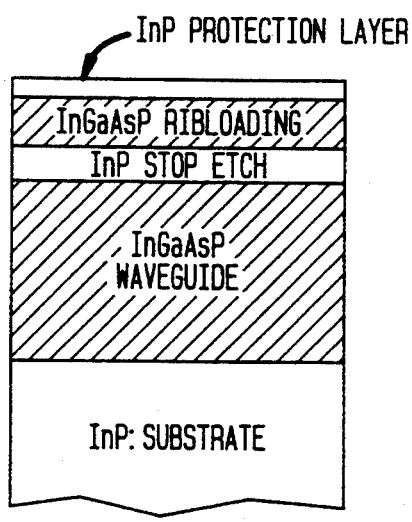
FIG. 3 also shows four stages of making the filter but uses another preferred method of forming the current blocking regions.
Figure 3B:
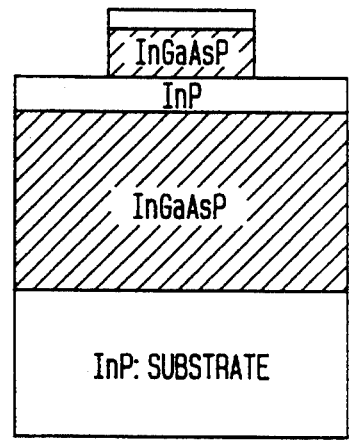
Figure 3C:
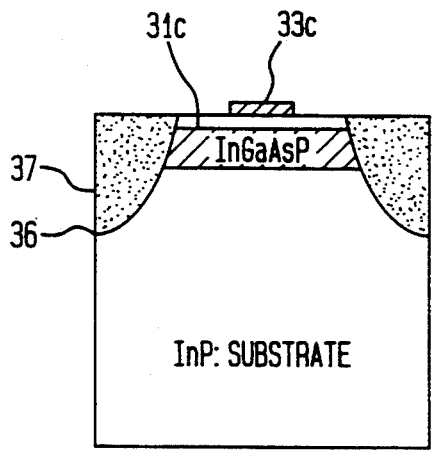
Figure 3D:
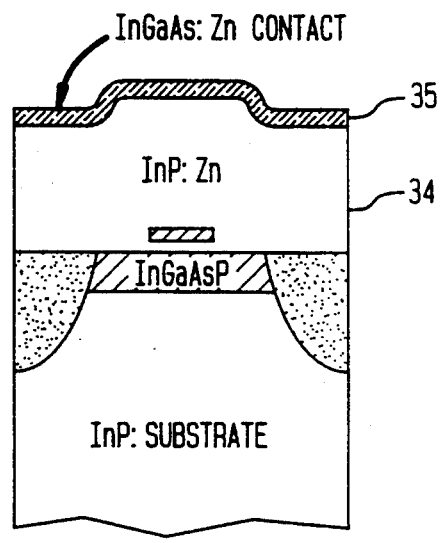

The present invention is a semiconductor wavelength filter with quick tunability, wide spectral range, high finesse, low waveguide loss, and high peak transmittance. A schematic of this device is shown in FIG. 1. The present invention comprises a waveguide region 1, a substrate region 7, an upper region 10, and current blocking regions 2.

In the preferred embodiment of FIG. 1, a dotted line demarcates waveguide region 1 from upper region 10. Waveguide layer 1 comprises a waveguide layer 5 and a waveguide rib layer 6. Both these layers consist of a second semiconductor which may be selected from either Group III-V compounds or Group II-VI compounds. The second semiconductor is selected such that it does not absorb light at the transmitted wavelength. The embodiment of FIG. 1 uses Indium Gallium Arsenide Phosphide which ranges in bandgap from 1.2 $\mu$m to 1.48 $\mu$m so that it remains transparent at zero bias and at all tuning currents for transmitted light in the 1.55 $\mu$m region.

Waveguide rib layer 6 channels the light down the center of waveguide layer 5 and away from the sides of the waveguide layer 5. This prevents the light from scattering along the rough, etched sides of waveguide layer 5. Waveguide rib layer 6 should be sized to provide a cross-sectional area just small enough for the light to propagate in its fundamental mode alone.

Substrate region 7 comprises a substrate layer 8 and a first contact layer 9. Substrate layer 8 consists of a first semiconductor which may be selected from either Group III-V compounds, Group II-VI compounds, or Group IV elements. In this particular embodiment, first semiconductor is an n-type Indium Phosphide. First contact layer 9 consists of an n-type contact material. First contact layer 9 is adapted for electrical contact.

Upper region 10 comprises an upper layer 11, a transitional layer 12, and a second contact layer 13. Upper layer 11 consists of a third semiconductor which may be selected from either Group III-V compounds, Group II-VI compounds, or Group IV elements. In this embodiment, third semiconductor is a p-type Indium Phosphide doped with Zinc. Second contact layer 13 consists of a p-type conductive material. Like first contact layer 9, second contact layer 13 is adapted for electrical contact, thereby completing a circuit across the filter. Current flow is aided by transitional layer 12 which provides an interface between second contact layer 13 and upper layer 11. In FIG. 1's embodiment, transitional layer 12 consists of Indium Gallium Arsenide doped with Zinc.

To increase the current density through waveguide region 1, current blocking regions 2 narrow the current flow through waveguide region 1. Current blocking regions 2 may consist of an insulating material such as Indium Phosphide doped with Iron, or alternatively, may comprise a reversed biased p-n junction to prevent current flow.

The device is tuned by applying current across the filter which injects carriers in waveguide region 1. These carriers cause a change in the refractive index of waveguide region 1. The dependence of the refractive index on the carrier density (dn/dN) was evaluated for the embodiment of FIG. 1 and found to be $-6 \times 10^{-21}/cm^3$, while the temperature dependence of the index (dn/dT) is $3 \times 10^{-4}/°C$. This facilitates tuning ranges exceeding 5.9 nm (740 GHz). It will be apparent to those skilled in the art that the conductivity type of substrate region 7 and upper region 10 can be reversed. That is, rather than substrate region 7 and upper region 10 being an n-type and a p-type conductivity type respectively, they can be an p-type and an n-type respectively. Additionally, while a planar geometry has been specifically described above, a mesa geometry may be preferred in some instances. Furthermore, other substrate orientations are contemplated.

The filter is manufactured by first growing a wafer, and then cleaving it into filter chips. The wafer is grown by a combination of Low Pressure (LP) and Atmospheric Pressure (AP) Metal Organic Vapor Phase Epitaxy (MOVPE). The growth and processing sequence is shown in FIG. 2 wherein like parts are like numbered. First, a waveguide layer 21 ranging in thickness from 1000 Å to 5000 Å is grown over a substrate layer 20. A stop etch layer 22, which can range in thickness from 100 Å to 300 Å, is then grown over waveguide layer 21. Next, a waveguide rib layer 23a ranging in thickness from 200 Å to 500 Å is grown over stop etch layer 22. A mask is then placed over the center portion of waveguide rib layer 23a and an etching agent is applied. The agent etches the sides of waveguide rib 23a to form waveguide rib 23b. The width of waveguide rib 23b should not exceed 2 μm.

Once the waveguide region of the filter is prepared, either alternative step A or B can be performed on the wafer to complete the growth stage.

Under alternative A, a thick (1.5 μm) upper layer 24c is grown over the waveguide region, followed by a transitional layer 25. Next, a wider mask (8–12 μm) is centered over waveguide rib 23b, and deep (2.5 μm) cavities 26 are etched through upper layer 24d into waveguide layer 21d by a combination of reactive ion etching and chemical etching. Since these etched sidewalls are well away from the light channel (i.e., the region under wide waveguide rib 23b), the guided light does not scatter at etching and regrowth imperfections, resulting in very low loss waveguides. In the final growth step, thick (2.5 μm) current blocking regions 27 are grown in cavities 26 to confine the current and planarize the structure.

FIG. 3 refers to alternative B. Under this alternative, a wider mask (4–8 μm) is centered over waveguide rib 33c, and cavities 36 are etched into waveguide layer 31c by a combination of reactive ion etching and chemical etching. Next, current blocking regions 37 are grown in cavities 36 to confine the current and planarize the structure. The last growth step involves growing a thick (1.5 μm) upper layer 34 over the waveguide region, followed by a transitional layer 35.

Following the growth step, the wafers are metallized, and cleaved into 20–1000 μm long filters. Last, thin film mirrors are deposited on the cleaved facets by standard deposition techniques. The filters would then be mounted on heat-sinks for use.

Obviously, numerous modifications and variations of the present invention are possible in light of the above teachings. It is therefore understood that within the scope of the appended claims, the invention may be practiced otherwise than as specifically described herein.

What is claimed is:

1. An electrically tunable filter for wavelength filtering of inputted light, comprising:

a) a substrate region comprising a first semiconductor;

b) a waveguide region over said substrate region, said waveguide region comprising a second semiconductor having a bandgap wavelength sufficiently shorter from the light thereby allowing high peak transmission of the light without any emission of the light;

c) an upper region over said waveguide region, said upper region comprising a third semiconductor;

d) current blocking regions adjacent to said waveguide region, said current blocking regions comprising a current blocking material, said current blocking regions narrow said waveguide region thereby increasing current density through said waveguide region; and e) electrode means for applying current to said waveguide region causing a change in said waveguide region's refractive index tuning said filter.

2. The filter of claim 1, wherein said first and third semiconductors are selected from the group consisting of Group III-V compounds, Group II-VI compounds, and Group IV elements, and wherein said second semiconductor is selected from the group consisting of Group III-V compounds and Group II-VI compounds.

3. The filter of claim 2, wherein said first semiconductor is an n-type material and said third semiconductor is a p-type material.

4. The filter of claim 2, wherein said waveguide region comprises Indium Gallium Arsenide Phosphide.

5. The filter of claim 4, wherein said first semiconductor is an n-type material and said third semiconductor is a p-type material.

6. The filter of claim 5, wherein said substrate region comprises a substrate layer and a first contact layer, and wherein said upper region comprises an upper layer, a transition layer, and a second contact layer, said first and second contact layers adapted for electrical contact.

7. The filter of claim 6, wherein said substrate layer comprises Indium Phosphide, said upper layer comprises Indium Phosphide doped with Zinc, and said transitional layer comprises Indium Gallium Arsenide.

8. An electrically tunable filter for wavelength filtering of inputted light, comprising:
   a) a substrate region comprising a first semiconductor;
   b) a waveguide region over said substrate region, said waveguide region comprising a second semiconductor having a bandgap wavelength sufficiently different from the light thereby allowing high peak transmission of the light without any emission of the light, said waveguide region comprising a waveguide layer and a waveguide rib layer, both layers being substantially similar in semiconductor composition and substantially similar in carrier concentration, said waveguide rib layer being just wide enough to allow fundamental mode wave propagation;
   c) an upper region over said waveguide region, said tipper region comprising a third semiconductor;
   d) current blocking regions adjacent to said waveguide region, said current blocking regions comprising a current blocking material, said current blocking regions narrow said waveguide region thereby increasing current density through said waveguide region; and
   e) electrode means for applying current to said waveguide region causing a change in said waveguide region's refractive index tuning said filter.

9. The filter of claim 8, wherein said first and third semiconductors are selected from the group consisting of Group III-V compounds, Group II-VI compounds, and Group IV elements, and wherein said second semiconductor is selected from the group consisting of Group III-V compounds and Group II-VI compounds.

10. The filter of claim 9, wherein said first semiconductor is an n-type material and said third semiconductor is a p-type material.

11. The filter of claim 9, wherein said waveguide region comprises Indium Gallium Arsenide Phosphide.

12. The filter of claim 11, wherein said first semiconductor is an n-type material and said third semiconductor is a p-type material.

13. The filter of claim 12, wherein said substrate region comprises a substrate layer and a first contact layer, and wherein said upper region comprises an upper layer, a transition layer, and a second contact layer, said first and second contact layers adapted for electrical contact.

14. The filter of claim 13, wherein said substrate layer comprises Indium Phosphide, said upper layer comprises Indium Phosphide doped with Zinc, and said transitional layer comprises Indium Gallium Arsenide.

15. A method for manufacturing an electrically tunable filter, comprising:
   a) growing a substrate layer;
   b) growing a waveguide region over said substrate layer using a combination of Low Pressure (LP) and Atmospheric Pressure (AP) Metal Organic Vapor Phase Epitaxy (MOVPE);
   c) growing an upper region over said waveguide region;
   d) growing current blocking regions to increase current density in waveguide region;
   e) metallizing under said substrate layer and over said upper region permitting current to said waveguide region causing a change in said waveguide region's refractive index to tune said filter;
   f) cleaving said layers and said regions to form cleaved facets defining lengths of said filter ranging from 20 to 1000 microns; and
   g) coating said cleaved facets to form mirror surfaces.

16. The method of claim 15, wherein growing said waveguide region comprises:
   (i) growing a waveguide layer;
   (ii) growing a stop etch layer over said waveguide layer;
   (iii) growing a waveguide rib over said top etch layer;
   (iv) placing a mask over the center of said waveguide rib layer; and,
   (v) etching said waveguide rib layer.

17. The method of claim 16, wherein placing the mask over said waveguide rib layer comprises using a mask so that said waveguide rib is just narrow enough to permit only fundamental mode wave propagation.

18. The method of claim 15, wherein growing said current blocking regions follows growing said waveguide region and comprises:
   (i) etching the sides of said waveguide region to form cavities; and,
   (ii) growing said current blocking regions in said cavities 19. The method of claim 15, wherein growing said current blocking regions follows growing said upper region and comprises:
   (i) etching the sides of said upper region and said waveguide region to form cavities; and,
   (ii) growing said current blocking regions in said cavities.

20. An electrically tunable filter for wavelength filtering of light, comprising:
   a) a substrate region comprising a first semiconductor;
   b) a waveguide region over said substrate region, said waveguide region comprising a second semiconductor having a bandgap less than 1.55 $\mu$m thereby allowing high peak transmission of the light, said waveguide region comprising a waveguide layer and a waveguide rib layer, both layers being substantially similar in semiconductor composition and substantially similar in carrier concentration, said waveguide rib layer being just wide enough to allow fundamental mode wave propagation;
   c) an upper region over said waveguide region, said upper region comprising a third semiconductor;
   d) current blocking regions adjacent to said waveguide region, said current blocking regions comprising a current blocking material, said current blocking regions narrow said waveguide region thereby increasing current density through said waveguide region; and e) electrode means for applying current to said waveguide region causing a change in said waveguide region's refractive index tuning said filter.

21. The method of claim 16, wherein placing the mask over said waveguide rib layer comprises using a wide mask so that said waveguide rib layer channels the light down center of said waveguide layer and away from sides of said waveguide layer.

* * * * *